United States Patent
Prest et al.

(10) Patent No.: US 7,482,580 B2
(45) Date of Patent: Jan. 27, 2009

(54) DYNAMIC ADJUSTMENT OF ION MONITORING PERIODS

(75) Inventors: Harry F. Prest, Santa Cruz, CA (US); James D. Foote, Sunnyvale, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 499 days.

(21) Appl. No.: 11/375,184

(22) Filed: Mar. 14, 2006

(65) Prior Publication Data

US 2007/0114374 A1    May 24, 2007

Related U.S. Application Data

(63) Continuation-in-part of application No. 11/254,337, filed on Oct. 20, 2005, now abandoned.

(51) Int. Cl.
*B01D 59/44* (2006.01)
(52) U.S. Cl. .................. 250/281; 250/282; 250/283; 250/287; 250/396 R
(58) Field of Classification Search .............. 250/281, 250/282, 283, 287, 396 R
See application file for complete search history.

(56) References Cited

U.S. PATENT DOCUMENTS

| | | | |
|---|---|---|---|
| 4,507,555 A | 3/1985 | Chang | |
| 4,686,365 A | 8/1987 | Meek et al. | |
| 5,006,706 A | 4/1991 | Marcus et al. | |
| 6,124,592 A | 9/2000 | Spangler | |
| 6,504,149 B2 | 1/2003 | Guevremont et al. | |
| 6,558,630 B1 | 5/2003 | Degn et al. | |
| 6,570,153 B1 * | 5/2003 | Li et al. | 250/292 |
| 6,770,875 B1 | 8/2004 | Guevremont et al. | |
| 6,838,666 B2 | 1/2005 | Ouyang et al. | |
| 2007/0090287 A1 * | 4/2007 | Foote et al. | 250/292 |
| 2008/0073538 A1 * | 3/2008 | Vija et al. | 250/363.04 |

* cited by examiner

*Primary Examiner*—Jack I Berman
*Assistant Examiner*—Johnnie L Smith, II

(57) ABSTRACT

Methods, systems and computer readable media for dynamically controlling a time period of ion detection by an ion detector of a mass spectrometer. A current resulting from conversion of an output of the detector is surveyed during the ion detection by the detector. The time period for the ion detection is terminated upon calculation of a statistically valid accumulation statistic, calculation indicating that satisfactory statistics cannot be achieved over the time period, relative to a predetermined statistical threshold, or elapsing of the entire time period having been preset.

23 Claims, 4 Drawing Sheets

DYNAMIC ADJUSTMENT OF ION MONITORING PERIODS

CROSS-REFERENCE

This application is a continuation-in-part application of Ser. No. 11/254,337, filed Oct. 20, 2005, titled "Intelligent SIM Acquisition", pending, which is incorporated herein by reference in its entirety and to which application we claim priority under 35 USC § 120.

BACKGROUND OF THE INVENTION

The basic principle of mass spectrometry is to generate ions, to separate these ions by their mass-to-charge ratios (m/z) and to detect them quantitatively according to their respective m/z ratios. A scanning mass spectrometer is arranged to allow only those ions of a (nominal) single m/z to be detected at any instant in time (as resolution allows). Over time, however, the control parameters of the separation can be varied so as to scan a sequential range of m/z ions. Scanning starts at a predetermined m/z and increments (or decrements) at a predetermined rate (scan rate) until a predetermined final m/z is achieved. The resulting detector output signal is monitored during the scan dwell time after each m/z increment (or decrement) and is subsequently recorded. This generates a record of ion intensity versus m/z (and time). The scan is then typically repeated for a specified and predesignated period of time. The initial m/z, final m/z, scan dwell and resulting scan cycle time are preset and fixed prior to scanning and acquiring data.

Alternatively, in another mode of operation of a scanning instrument, the control parameters can be fixed at a particular m/z for a set period of time. This analysis of a single m/z is called selected ion monitoring or SIM for short. Typically a specified group of m/z's is SIMed together in a sequence, which is called a SIM group. The SIM group measurement cycle begins by selecting the first m/z in the group. The operating control parameters are allowed to stabilize and the selected m/z ions are allowed time to traverse into the ion detector. The resulting detector output signal is then monitored for a specified period of time (referred to as the SIM dwell) and recorded. Next the control parameters are switched to values necessary to select the next m/z in the measurement cycle. This process repeats until all m/z's in the group have been monitored and recorded. The SIM cycle is then repeated continuously for a specified period of time. The SIM dwell for each m/z and the resulting SIM cycle time are also preset and fixed prior to SIMing and acquiring data.

For historical and technical reasons, the SIM dwell times and scan dwell time as outlined above are fixed prior to and during operation. Consequently, the scan cycle time and SIM cycle time are also predetermined and invariant. This deterministic approach makes the sequencing of events a straightforward proposition and relatively easy to implement. Data analysis is also simplified.

SUMMARY OF THE INVENTION

Methods, systems and computer readable media are provided for dynamically controlling a time period of ion detection by an ion detector of a mass spectrometer during SIM or scan. The output signal of the detector may be statistically monitored during single m/z ion detection by the detector. A time period for the ion detection by the ion detector may be terminated upon calculation of a statistically valid accumulation statistic or calculation indicating that satisfactory statistics cannot be achieved over the time period, relative to a predetermined statistical threshold.

DETAILED DESCRIPTION OF THE INVENTION

Figure 1:
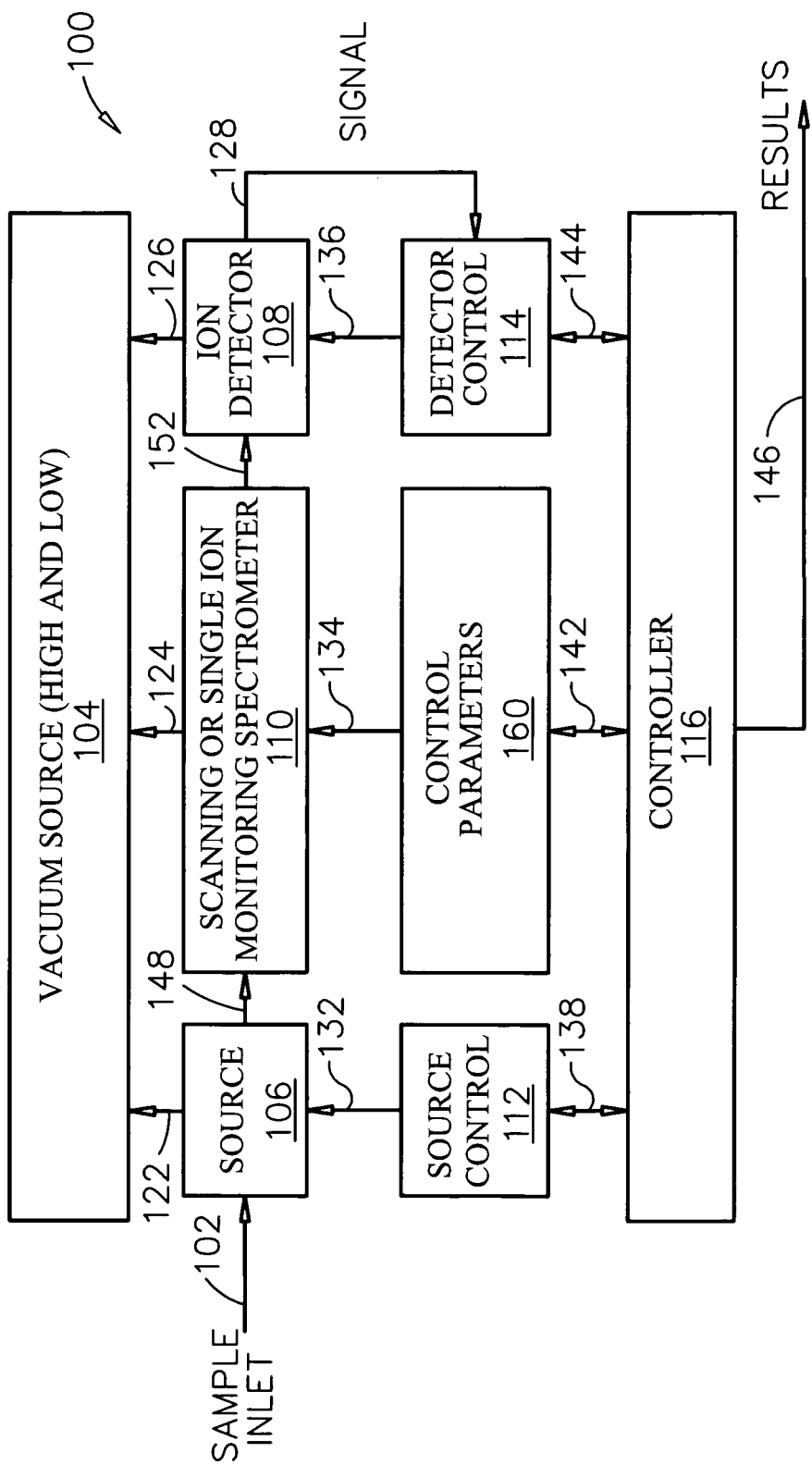
FIG. 1 is a block diagram representing an exemplary scanning mass spectrometry system.

Before the present systems and methods are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "a module" includes a plurality of such modules and reference to "the period includes reference to one or more periods and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

FIG. 1 is a block diagram illustrating a scanning mass spectrometry system 100 according to one exemplary embodiment. A sample of material to be analyzed is transported via sample inlet 102 to source 106. In one embodiment, the sample inlet is a membrane or restricted device used in sampling air and simple gases. In another embodiment, the sample inlet is a more sophisticated device such as, for example, a gas chromatography, liquid chromatography, or solid phase sampler. Source 106 generates ions from the material in sample inlet 102. Source 106, in various embodiments, is one or more of: an electron ionization source, a chemical ionization source, an electrospray pressure source, an atmospheric pressure source, or any other suitable source that converts the sample in sample inlet 102 into single or multiple charged ions. Source 106 transports the ions to scanning or single ion monitoring mass spectrometer 110 via connection 148.

The scanning or single ion monitoring spectrometer 110 allows ions of the selected mass-to-charge ratio (m/z) to pass to the output port of the mass filter. With appropriate control parameters, scanning or single ion monitoring spectrometer 110 selects ions of a particular m/z from a plurality of ions generated by source 106. The selected ions then pass via connection 152 to detector 108. Scanning or single ion monitoring spectrometer 110 is used to scan an m/z range to locate particular ions within that m/z range, or is used to select ions of a single m/z in what is referred to as selected ion monitoring, or "SIMing". Scanning or single ion monitoring spectrometer 110 may use any number of separation techniques such as a single quadrupole mass filter in one embodiment. In another embodiment, scanning or single ion monitoring spectrometer 110 includes multiple quadrupole mass filters having collision cells such as used in triple quadrupole mass filter and quadrupole time of flight (abbreviated as q-TOF) instruments. Alternative embodiments include mass sector mass spectrometers and ion trap spectrometers.

Detector 108 collects ions from scanning or single ion monitoring spectrometer 110 and converts them to electrons (or another appropriate electronic signal) to measure signal intensity of the ions. In various embodiments, detector 108 may include one or more of continuous conversion dynodes, discrete conversion dynodes, or photomultiplier transducers. The output signal from detector 108 is provided by connection 128 to detector control electronics 114.

Vacuum source 104, which provides both high and low vacuum, evacuates source 106 via connection 122, 110 via connection 124 and detector 108 via connection 126 to produce the appropriate vacuum required for the specific elements. The vacuum pumps (not shown) in vacuum source 104 in one embodiment may include rotary vane or dry pumps for low vacuum and turbo molecular or diffusion pumps to provide high vacuum.

Source control 112 provides the necessary operating parameters for operation of source 106. These parameters may include, but are not limited to static and dynamic DC and RF voltages, heater control, flow control and filament control in some embodiments.

Control parameters 160 provide the required operating parameters for scanning or single ion monitoring spectrometer 110. In some embodiments, control parameters 160 may also include pre- and post-ion guides or lensing to support transmission into or out of scanning or single ion monitoring spectrometer 110.

Detector control 114, in this embodiment, generates the required voltages for detector 108. In one embodiment, detector control 114 includes electronic amplifiers to convert or boost the ion signal in order to measure signal intensity of the signal out of detector 108. In some embodiments the amplifiers may be analog elements with various dynamic ranges, while in other embodiments the amplifiers may be pulse counters that "count" the ions.

Controller 116, in this embodiment, controls all the elements within scanning mass spectrometer system 100. In some embodiments, controller 116 is a simple control circuit. In other embodiments, controller 116 may be a fully embedded computer processor having an onboard operating system.

The output of detector 108 on connection 128 is a measurement of the ion intensity and is used by controller 116 to correlate the sample of interest to the final measurement. The output of controller 116 on connection 146 comprises data that is used directly or indirectly by elements located downstream of mass spectrometer 100 to interpret and correlate the sample from the sample inlet to the final measurement. Typically, the results are mass spectra or some form of mass information related to the sample ions.

Figure 2A:
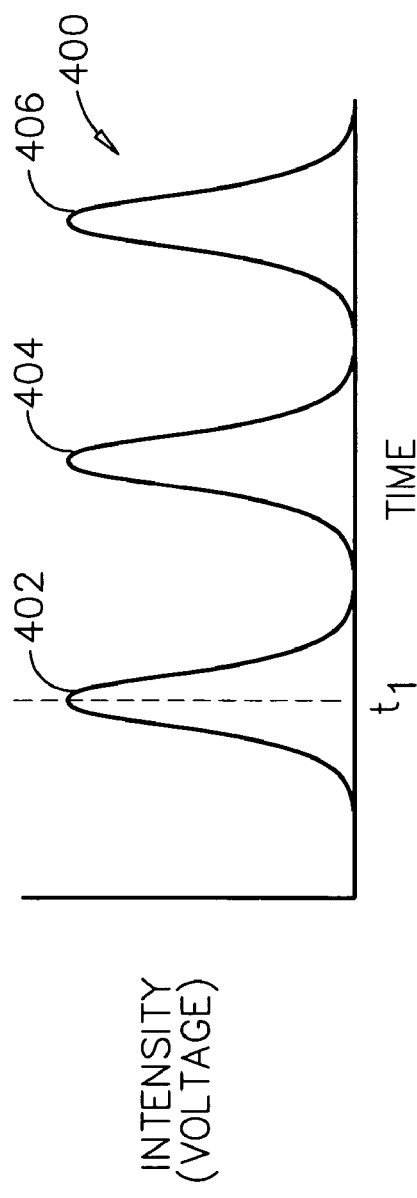
FIG. 2A schematically illustrates a plot of a group of peaks representing components of a sample run through a gas chromatograph.

It may be desirable and more efficient to reduce the overall SIM cycle time, when possible. For example, FIG. 2A schematically illustrates a plot 400 of a group of peaks 402, 404, 406 representing components of a sample run eluted from a gas chromatograph versus time. In order to more accurately analyze the makeup of the component represented by peaks 402, 404, 406, the sample may be further processed by a mass spectrometer, which further fragments the components represented by peaks 402, 404, and 406, and identifies the fragments.

Figure 2B:
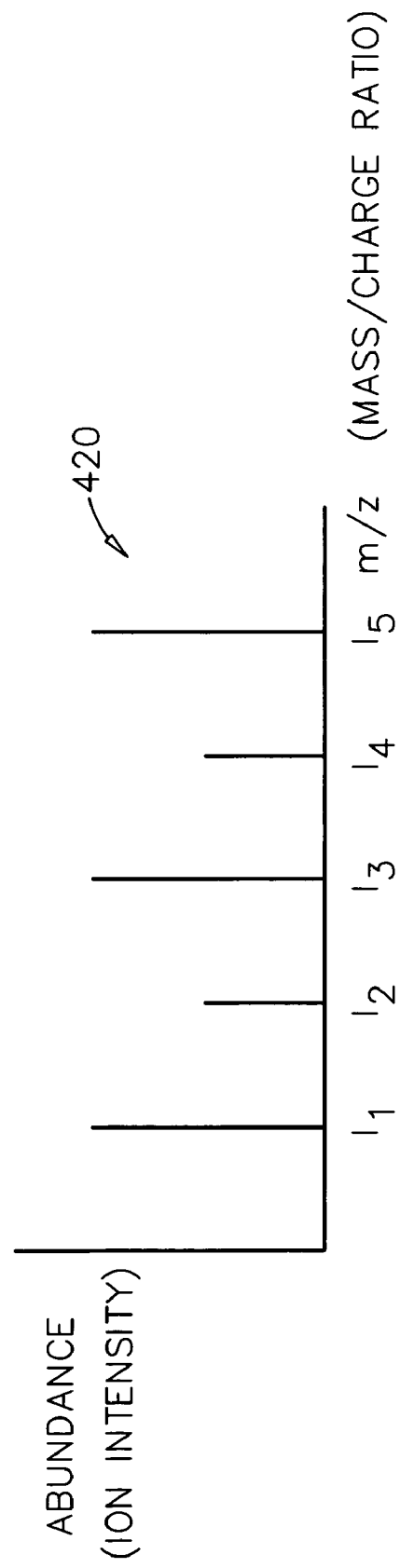
FIG. 2B schematically illustrates a plot of peak data from a mass spectrometry scan of the components of the sample at time $t_1$ in FIG. 4A.

For each scan of the sample, corresponding to the time and peak data of FIG. 2A, the mass spectrometer outputs peak values for each of the fragments identified at that time. For example, at time $t_1$ shown in FIG. 2A, the mass spectrometer output 420 may be as shown in FIG. 2B, wherein five different ions ($I_1$, $I_2$, $I_3$, $I_4$, $I_5$) are displayed with their corresponding ion intensities. Thus, each scan (FIG. 2B) provides a further detailed analysis (ion intensity versus m/z) of a "slice" of the intensity versus time data plotted in FIG. 2A. The sum of the intensities of the ions in FIG. 2B should be equal to the intensity of the point in peak 402 that is intersected by time $t_1$. The pattern resulting from the intensities and mass to charge ratios of the ions plotted in 420 forms a fingerprint that is specific to the compound that was analyzed at time $t_1$.

When performing selected ion monitoring (SIM), an analysis of a compound by mass spectroscopy (e.g., such as a further analysis of peak 402, in the example above) may be carried out by selecting representative ions, such as those that are unique and/or relatively intense (preferably both) and then those ions are repeatedly scanned for analysis over the time duration of the peak that is being further analyzed. Thus, whether scanning all of the peaks repeatedly, or performing SIM for further analysis, if the total time of analyzing a full scan cycle or SIM cycle can be reduced, this allows for a larger number of total cycles to be performed relative to the fixed span of time that the peak being analyzed occurs over. It is desirable to maximize the number of cycles, as this provides more data and reduces the statistical uncertainty of the overall data.

As noted, it may be desirable to reduce the SIM dwell or scan dwell time where possible to reduce the overall cycle time. In certain instances, it is possible to reduce the time dynamically, without loss of usable information. If the ion signal is strong, with low variability, only a fraction of the dwell time is needed to accurately determine the abundance of that ion, and this is the basis for reducing the SIM or scan time. On the other hand, if the variability of the signal is high, as is typical for low abundance background or trace ions, then even the full dwell time may not be sufficient to accurately quantitate the abundance of this ion, so that the result, if measurement is conducted for the full dwell time, is a waste of a full dwell time period, since no accurate information is obtained from this situation. Thus, a full, fixed or pre-specified SIM time is needed only for those ions having indeterminate variability, not too low and not too high, to achieve the best abundance estimate. For such ions having indeterminate variability, the full dwell time may be used to achieve the best abundance estimate for that ion, while still achieving the necessary sampling rate.

Figure 3:
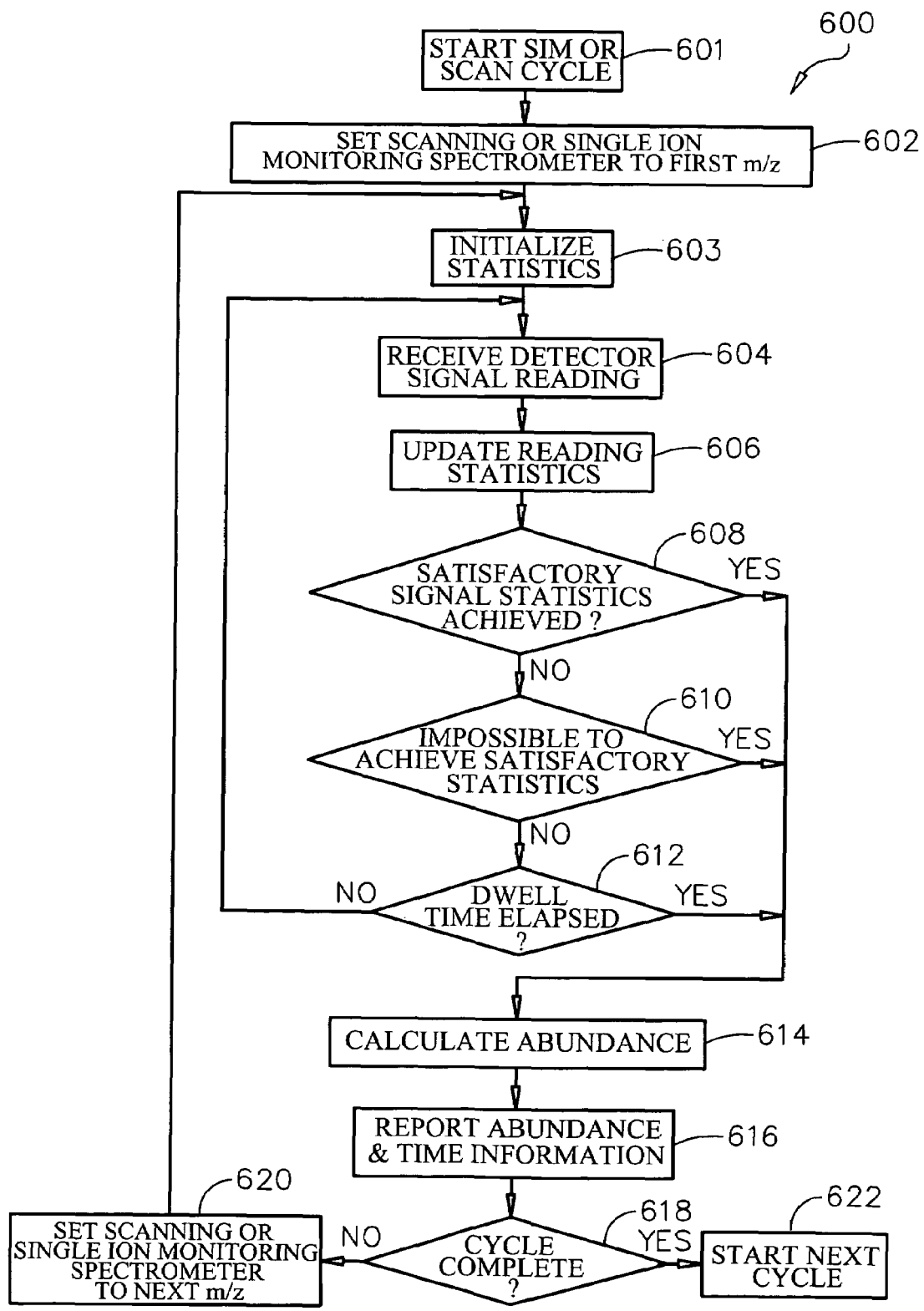
FIG. 3 is a flow diagram representing operation flow for control of a mass spectrometer in accordance with another embodiment.

Thus it is desirable to provide the capability to dynamically vary each dwell time, in real time, for each dwell (SIM dwell time or scanning dwell time), based on considerations of the signal from the ion as it is being acquired and statistics characterizing the signal as it is being acquired. FIG. 3 illustrates an operational flow 600 of a mass spectrometer with dynamic control of dwell time to improve the efficiency of SIM or scan cycle times. The operational flow 600 may be performed in any suitable computing environment. For example, a computing environment implemented by controller 116 may execute the operational flow 600.

At event 601, a SIM or scan cycle is initiated. At event 602, scanning or single ion monitoring spectrometer 110 is set to the first m/z to be processed. At event 603, a number of statistical parameters are initialized. These may include, but are not limited to the following: reading count (i.e., the number of readings of the current m/z), an accumulation (i.e., an accumulation or integration of readings), accumulation of the squared value of each reading, minimum reading, maximum reading, standard deviation of the readings, mean of the readings, relative standard deviation of the readings and a dynamic list of all the readings. In one embodiment, the aforementioned controller is configured to initialize the dwell time, reading count, accumulation and other statistical parameters by setting the values for these parameters to appropriate initial values, such as zero.

At event 604, a reading from an ion detector is received. In one embodiment, the reading is taken as in a conventional mass spectrometer. For example, in one implementation, the reading is a sample of an output signal generated from an ion detector such as detector 108, for example, taken by a controller, such as controller 116, for example.

At event 606, the reading from event 604 is used to update the statistical information. This may include, but is not limited to the following: increment the reading count (i.e., the number of readings), increment the accumulation by the reading (i.e., an accumulation or integration of readings), accumulation of the squared value of each reading, minimum reading maximum reading, standard deviation, mean, relative standard deviation and/or a dynamic list of all readings. These parameters are updated to reflect the reading statistics for the selected m/z.

In one embodiment, the reading may be added to the accumulation as in a conventional mass spectrometer. In addition, a running tally of the signal statistics, including mean, variance, signal minimum, signal maximum, ion pulse count accumulation, ion pulse count statistics and total number of readings may be generated and updated with each reading.

At event 608, it is determined whether satisfactory statistics have been achieved. If the statistics are sufficiently good, the process executes event 614 to calculate the ion intensity based on the current accumulation and reading count for the currently selected ion. What is determined to be "sufficiently good" or "satisfactory" statistics may vary depending upon the requirements of the application or experiment being conducted, and the selection of the statistical criteria. In any event, the dwell time is allowed to vary dynamically based on those statistical criteria that have been selected/set. One example of a criterion for "sufficiently good" includes calculating an RSTD (relative standard deviation) less than a certain value, $x_1$, and with a statistical confidence greater than a certain value, $x_2$. A corresponding criterion for "sufficiently poor" might be calculating an RSTD greater than a certain value, $x_3$, with a statistical confidence greater than a certain value, $x_4$. Other simpler criteria for "sufficiently good" include an abundance count greater than a value $y_1$, over a preselected number of measurements, $y_2$. A corresponding "sufficiently poor" criterion for evidence may include an abundance count less than a value $y_1$ over the preselected number of measurements, $y_2$. Other alternative criteria may also be established that include elements of all of the above criteria and/or other statistical factors. The key factor again, being that the dwell time is allowed to dynamically vary based on statistical criteria.

At event 616, the ion intensity and time information (dwell time and/or absolute time) are reported. In one embodiment, the controller stores the ion intensity and timing information in memory for use by other elements located downstream of the mass spectrometer to interpret and correlate the sample from the sample inlet to the final measurement. Typically, the results are mass spectra or some form of mass information related to the sample ions.

Moving to event 618, it is determined whether the cycle is complete. In one embodiment, the controller is configured to determine whether all of the ions have been selected in this cycle. If it is determined that there is still one or more ions to be selected, the operational flow 600 proceeds immediately to event 620.

At event 620, the next m/z of the cycle is selected. In one embodiment, the controller is configured to select the next m/z of the SIM or scan cycle as in a conventional mass spectrometer. The operational flow 600 then returns to event 602 described above. By immediately starting the reading of the next selected m/z, rather than waiting for an expiration of an entire dwell time for each m/z, the overall cycle time is optimized, resulting in the shortest overall cycle time possible to provide satisfactory abundance counts for all selected ions where possible.

Referring back to event 618, if it is determined that all of the ions of the cycle have been selected, the operational flow proceeds to event 622. At event 622, a next cycle can be immediately started, or processing may end if there is no additional cycle to process. For example the operational flow 600 can return to event 601 for the next SIM cycle or scan cycle.

If at event 608, satisfactory signal statistics have not yet been achieved, then the operational flow proceeds to event 610 to check whether it is possible to achieve satisfactory signal statistics. For very low intensity signals (low concentration of ions being measured), for example, those down in the range of the noise of the system, it may not be possible to achieve a satisfactory abundance count even after reading for the entire dwell time, because it is not possible to discern the counts from noise and/or because the variability of the readings is too great to be considered reliable. If this is the case, then flow proceeds to event 614. Otherwise, operational flow proceeds to event 612. As noted above, one statistic for determining when it may not be possible to achieve a satisfactory abundance count (i.e., when the statistics are "sufficiently poor") includes a criterion that evaluates when an abundance count is less that a predetermined value (predetermined abundance count) over a predetermined number of measurements. Thus, at event 610, using this criterion, the flow follows the "no" path to event 612 if the preset number of signal readings for the current ion have not yet been performed. The no path is also followed, if during the reading that equals the preset number of readings, the abundance count has met or exceeded the predetermined value.

By predicting whether it will be possible to achieve a satisfactory abundance count for a selected ion at a very early stage in the processing, relative to an entire dwell time, in any of the manners described above, the system minimizes the time that would otherwise be wasted in count read cycles for a selected m/z when that ion is not present, or is not present in sufficient concentration to provide a meaningful reading.

For selected ions in concentrations that produce what is referred to here as "medium intensity" signals, i.e., where the abundance is not so great as to achieve satisfactory signal statistics early in the dwell time span, nor are the statistics poor enough to predict unsatisfactory statistics early in the dwell time, iterations of count readings may proceed until the entire dwell time as elapsed. When it is determined at event 612 that the dwell time has elapsed, the operational flow proceeds to event 614. According to the techniques described, each selected m/z is read for only so long as a satisfactory abundance count can be achieved, if one is achievable, or until the maximum dwell time has elapsed, and therefore even ions with intermediate concentrations (resulting in "medium intensity" readings) may be processed for less than a full dwell time, further minimizing the cycle time, and allowing a greater number of cycles to be performed over a fixed time period. By surveying the output form the detector (and/or electrometer and/or A/D converter) in real time, the system can intelligently and dynamically adjust dwell times to optimize SIM or scan cycle times.

Intelligent surveying of the detector output (and/or electrometer and/or A/D converter) in a manner as described above, may be useful not only for optimizing dwell time and thus cycle times, but also to optimize dwell times to achieve abundance counts that meet the statistical requirements of a user. Such statistical requirements may be user-defined and the system may tailor the dwell times accordingly to achieve the statistical requirements. For example, for each SIM or scan, a user may preset an uncertainty or variability limit of what is considered a statistically acceptable abundance count. For each scan or SIM, the system may then iterate read counts in a manner as described above, each time monitoring the signal output from the current read and checking variability of the read counts, divided by the total number of reads, against the preset variability threshold for that scan or SIM. Iterations may be continued until the variability of the accumulation divided by the number of reads is less than the preset variability threshold. In this way, the system spends only as much time as necessary for each selected ion/ion group to achieve an abundance count that statistically satisfies the user's needs. Additionally the target compound criteria may require valid statistics of multiple fragment ions. If any one ion has invalid statistics, it may be optimal to reduce the SIM cycle time by not assessing (i.e. canceling the scanning of) the statistics of the remaining fragment ions associated with the target compound. Effectively the statistical calculation may incorporate a dynamic ion reject list based on the statistics of other ions. Thus the dwell time of one ion may also be optimized by also factoring in the statistics of other ions in the group.

Figure 4:
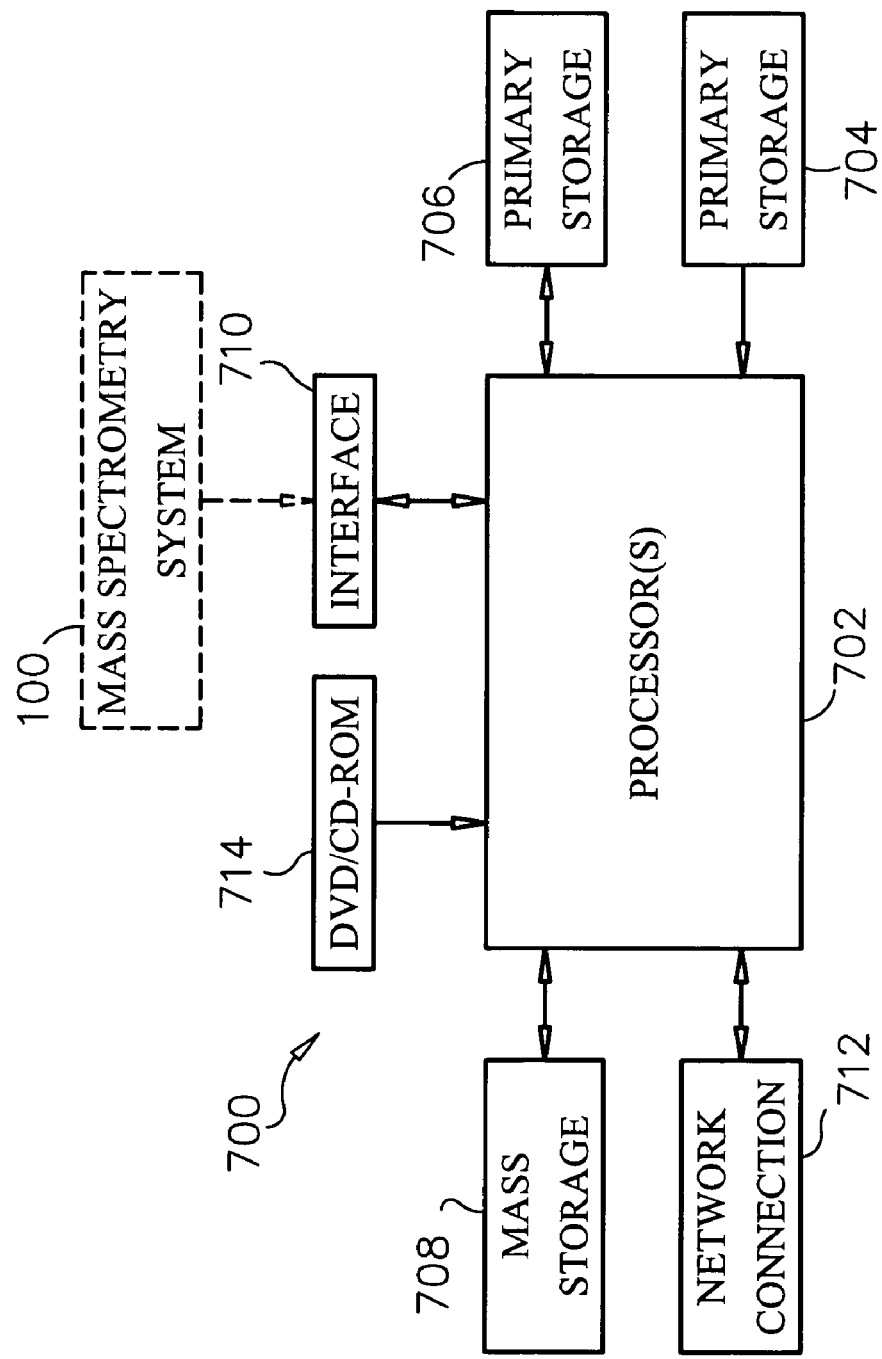
FIG. 4 illustrates a typical computer system, all, or portions of which may be employed in an embodiment of the present invention.

FIG. 4 illustrates a typical computer system in accordance with an embodiment of the present invention. The computer system 700 may include any number of processors 702 (also referred to as central processing units, or CPUs) that are coupled to storage devices including primary storage 706 (typically a random access memory, or RAM), primary storage 704 (typically a read only memory, or ROM). As is well known in the art, primary storage 704 acts to transfer data and instructions uni-directionally to the CPU and primary storage 706 is used typically to transfer data and instructions in a bi-directional manner Both of these primary storage devices may include any suitable computer-readable media such as those described above. A mass storage device 708 is also coupled bi-directionally to CPU 702 and provides additional data storage capacity and may include any of the computer-readable media described above. Mass storage device 708 may be used to store programs, data and the like and is typically a secondary storage medium such as a hard disk that is slower than primary storage. It will be appreciated that the information retained within the mass storage device 708, may, in appropriate cases, be incorporated in standard fashion as part of primary storage 706 as virtual memory. A specific mass storage device such as a CD-ROM or DVD-ROM 714 may also pass data uni-directionally to the CPU.

CPU 702 is also coupled to an interface 710 that includes one or more input/output devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to a computer or telecommunications network using a network connection as shown generally at 712. With such a network connection, it is contemplated that the CPU might receive information from the network, or might output information to the network in the course of performing the above-described method steps. The above-described devices and materials will be familiar to those of skill in the computer hardware and software arts.

The hardware elements described above may implement the instructions of multiple software modules for performing the operations of this invention. For example, controller 116 may include one or more processors 702, and instructions for dynamically and statistically monitoring dwell times may be stored on mass storage device 708 or 714. Outputs from the controller can include, but are not limited to acquisition method parameter data. These include unprocessed or re-processed records of ion intensity, ion statistics and time information (dwell time and/or absolute time). Additionally or alternatively, a computer system 700 may receive results 146 from a scanning mass spectrometry system 100 (e.g., outputs from controller 116) through interface 710, or from other storage media on which outputs have been stored (e.g., CD-ROM, DVD-ROM, etc.). This computer system can also perform a variety of data post processing (including data retrieval, storage and transmission) downstream of the mass spectrometer to interpret and correlate the sample from the sample inlet to the final measurement. Typically the results are mass spectra or some form of mass information related to the sample ions. The computer system can also provide improvements in data quality and utility such as mass accuracy, abundance accuracy, ion statistics, deconvolution, library searching, reporting and quantization, as is known in the art.

In addition, embodiments of the present invention further relate to computer readable media or computer program products that include program instructions and/or data (including data structures) for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM, CDRW, DVD-ROM, or DVD-RW disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Reference has been made throughout this specification to "one embodiment," "an embodiment," or "an example embodiment" meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that embodiments may be practiced without one or more of the specific details, or with other methods, resources, materials, etc. In other instances, well known structures, resources, or operations have not been shown or described in detail merely to avoid obscuring aspects of the embodiments.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

That which is claimed is:

1. A method of dynamically controlling a time period of ion detection for a scanning mass spectrometer, said method comprising the steps of:
    statistically monitoring an output signal from a detector of the mass spectrometer during single m/z ion detection; and
    terminating the time period for the ion detection upon calculation of a statistically valid accumulation statistic or calculation indicating that satisfactory statistics cannot be achieved over the time period, relative to a predetermined statistical threshold.

2. The method of claim 1, wherein the time period is a SIM dwell time.

3. The method of claim 1, wherein the time period is a scan dwell time.

4. The method of claim 1, further comprising beginning monitoring a next m/z ion in a cycle sequence immediately after said terminating the time period.

5. The method of claim 1, wherein said single m/z ion detection is for a fragment ion of a target compound requiring valid statistics of multiple fragment ions, and wherein when time period is terminated upon said calculation indicating that satisfactory statistics cannot be achieved, said method further comprises canceling statistical monitoring of the remaining fragment ions associated with the target compound.

6. The method of claim 1, further comprising beginning monitoring a first m/z ion in a new cycle sequence immediately after said terminating the time period when there are no additional m/z ions to be monitored in a current cycle sequence.

7. The method of claim 4, wherein the time periods are dwell times, and wherein said terminating and beginning steps dynamically optimize a cycle time of the cycle sequence.

8. The method of claim 1, further comprising reporting timing information regarding said time period at the time of said terminating.

9. The method of claim 8, wherein said timing information comprises at least one of dwell time and absolute cycle time.

10. A method of dynamically controlling a time period of ion detection for a scanning mass spectrometer, said method comprising the steps of:
    receiving a reading from an ion detector of the mass spectrometer during single m/z ion detection;
    adding the reading to an accumulation;
    statistically monitoring the accumulation;
    terminating the time period for the ion detection upon calculation of a statistically valid accumulation statistic or calculation indicating that satisfactory statistics cannot be achieved over the time period, relative to a predetermined statistical threshold.

11. The method of claim 10, further comprising repeating said receiving, adding and statistical monitoring if said terminating is not carried out.

12. The method of claim 11, comprising repeating iterations of said receiving, adding and statistical monitoring until said terminating is carried out or until a predetermined time assigned to the time period has elapsed.

13. The method of claim 12, wherein the time period comprises a dwell time, said method further comprising initiating another dwell time for a next m/z ion in a cycle sequence, immediately after said terminating the time period or elapsing of the time period, whichever occurs first.

14. The method of claim 12, wherein the time period comprises a dwell time, said method further comprising beginning monitoring a first m/z ion in a new cycle sequence immediately after said terminating the time period or elapsing of the time period, whichever occurs first, when there are no additional m/z ions to be monitored in a current cycle.

15. The method of claim 10, further comprising initiating another time period for a next m/z ion in a cycle sequence immediately after said terminating the time period.

16. The method of claim 10, further comprising beginning monitoring a first m/z ion in a new cycle sequence immediately after said terminating the time period, when there are no additional m/z ions to be monitored in a current cycle.

17. The method of claim 10, further comprising reporting timing information regarding said time period at the time of said terminating.

18. The method of claim 17, wherein said timing information comprises at least one of dwell time and absolute cycle time.

19. The method of claim 17, further comprising reporting said timing information and an ion intensity value corresponding to the accumulation, of the ion or ion group detected, at the time of said terminating.

20. A system for use in a scanning mass spectrometer, the system comprising:
an ion detector;
a scanning or single ion monitoring spectrometer to selectively direct ions of a selected mass and charge to the ion detector; and
a controller to selectively accumulate and statistically monitor readings from the ion detector in detecting ions of the selected mass and charge and to terminate a time period for ion detection by the ion detector upon one of: calculation that an accumulation calculated from the accumulated readings is statistically valid or greater than or equal to a predetermined abundance count; and calculation indicating that a satisfactory abundance count cannot be achieved, relative to a predetermined statistical threshold, over the time period.

21. The system of claim 20, wherein said controller ends the ion detection after a predetermined time period, when said terminating the time period is not carried out.

22. A computer readable medium carrying one or more sequences of instructions for dynamically controlling a time period of ion detection by a scanning mass spectrometer, wherein execution of one or more sequences of instructions by one or more processors causes the one or more processors to perform the steps of:
receiving a reading from an ion detector of the mass spectrometer during single m/z ion detection;
adding the reading to an accumulation;
statistically monitoring the accumulation;
terminating the time period for the ion detection upon one of: calculation that the accumulation is statistically valid or greater than or equal to a predetermined abundance count; and calculation indicating that a satisfactory abundance count cannot be achieved, relative to a predetermined statistical threshold, over the time period.

23. The computer readable medium of claim 22, wherein ion detection by the ion detector is continued for a predetermined time assigned to the time period, when said terminating the time period is not carried out.

* * * * *